United States Patent [19]

George

[11] Patent Number: 5,475,550
[45] Date of Patent: Dec. 12, 1995

[54] ENHANCED CROSS-TALK SUPPRESSION IN MAGNETORESISTIVE SENSORS

[75] Inventor: Peter K. George, Bloomington, Minn.

[73] Assignee: Seagate Technology, Inc., Scotts Valley, Calif.

[21] Appl. No.: 239,270

[22] Filed: May 6, 1994

Related U.S. Application Data

[63] Continuation of Ser. No. 936,177, Aug. 25, 1992, abandoned.

[51] Int. Cl.⁶ ........................................ G11B 5/39
[52] U.S. Cl. ............................................ 360/113
[58] Field of Search .................... 360/110, 113, 360/123, 124, 125, 126

[56] References Cited

U.S. PATENT DOCUMENTS

| | | | |
|---|---|---|---|
| 3,840,898 | 10/1974 | Bajorek et al. | 360/113 |
| 4,103,315 | 7/1978 | Hempstead et al. | 360/113 |
| 4,663,685 | 5/1987 | Tsang | 360/113 |
| 4,713,708 | 12/1987 | Krounbi et al. | 360/113 |
| 4,755,897 | 7/1988 | Howard | 360/113 |
| 4,771,349 | 9/1988 | Tsang | 360/113 |
| 4,782,413 | 11/1988 | Howard et al. | 360/113 |
| 4,785,366 | 11/1988 | Krounbi et al. | 360/113 |
| 4,800,457 | 1/1989 | Kryder et al. | 360/113 |
| 4,803,580 | 2/1989 | Mowry | 360/113 |
| 4,809,109 | 2/1989 | Howard et al. | 360/113 |
| 4,825,325 | 4/1989 | Howard | 360/113 |
| 4,841,398 | 6/1989 | Mowry | 360/113 |
| 4,891,725 | 1/1990 | Mowry | 360/113 |
| 4,940,511 | 7/1990 | Fontana, Jr. et al. | 360/113 |
| 4,967,298 | 10/1990 | Mowry | 360/113 |
| 5,014,147 | 5/1991 | Parkin et al. | 360/113 |
| 5,181,149 | 1/1993 | Katsumata et al. | 360/113 |
| 5,192,618 | 3/1993 | Frankel et al. | 360/113 |

Primary Examiner—Stuart S. Levy
Assistant Examiner—Paul J. Ditmyer
Attorney, Agent, or Firm—Kinney & Lange

[57] ABSTRACT

A magnetoresistive transducer design for cross-talk supression and increased Neel temperature is disclosed. The transducer is formed by fabricating on a suitable substrate an antiferromagnetic material layer above and below the permalloy layer. The additional antiferromagnetic layer between the substrate and the permalloy increases the exchange coupling biasing of the magnetoresistive transducer thereby providing increased cross-talk supression and greater longitudinal bias. The location of the additional antiferromagnetic layer beneath the permalloy also increases the Neel temperature of the transducer. A permanent magnetic material can also be substituted for the antiferromagnetic material with the result that the longitudinal bias is increased by coupling to the upper and lower surfaces of the permalloy layer thereby doubling the effect.

6 Claims, 7 Drawing Sheets

ENHANCED CROSS-TALK SUPPRESSION IN MAGNETORESISTIVE SENSORS

This is a continuation of application Ser. No. 07/936,177, filed Aug. 25, 1992, now abandoned.

FIELD OF THE INVENTION

The invention relates to magnetoresistive sensors, particularly to magnetoresistive (MR) heads for magnetic recording disk drives.

BACKGROUND OF THE INVENTIVE

Magnetoresistive sensors responsive to changes caused by magnetic fields are increasingly employable as read transducers in smaller sized magnetic disk drive heads having decreased disc surface velocity because the resistivity changes depend on magnetic flux, not disk speed, and because sensor output may be scaled by the sense current.

These sensors usually comprise a thin strip of ferromagnetic alloy of low coercivity, such as NiFe (Permalloy), magnetized along an easy axis direction. Such magnetized strips are typically mounted in the head so that their easy axis is transverse to the direction of disk rotation and parallel to the plane of the disk. Magnetic flux from the disk causes rotation of the magnetization vector of the strip, which in turn causes a change in resistivity which can be detected by a sense current flowing between lateral contacts. The resistivity varies according to the cosine-square of the angle between the magnetization vector and the current vector. If the magnetization and current vectors are aligned, the initial change in resistivity due to disk magnetic flux is low and unidirectional. Typically, either the easy axis magnetization vector or the current vector is biased to approximately 45 degrees to increase responsiveness to angular change in the magnetization vector and to linearize the sensor output.

One problem encountered with MR sensors is Barkhausen noise caused by irreversible motion of magnetic domains in the presence of an applied field, i.e. coherent rotation of the magnetization vector is non-uniform or instead depends upon domain wall behavior. This noise mechanism is eliminated by creating a single magnetic domain in the easy axis direction of the strip.

Many different means have been employed to both linearize the sensor output and to provide for a single domain in the sense region. An increase in the length of a magnetoresistive strip relative to its height is known to contribute to formation of a single magnetic domain in the central portions of the strip. Multiple closure domains occur at the ends of long strips. These migrate toward the center under the influence of external fields. Long strips, however, may be subject to cross-talk in lateral portions of the strip and may conduct magnetic flux from adjacent tracks into the sense region of the strip. Short strips, in contrast, spontaneously "fracture" into multiple domains.

Efforts have been made to provide single domains in the sensor region by shaping the strip so as to reduce edge demagnetizing fields while providing a relatively short physical dimension in the sensor region. Even shaped strips "fracture" into multiple domains in the presence of strong transverse magnetic fields caused by the inductive write field. Soft-magnetic shields are conventionally employed to isolate the sensor from magnetic fields produced by the inductive writer or external fields.

The formation of single domains has been achieved by providing a longitudinal magnetic field in strips. Such a magnetic field has to be strong enough to cause the formation of a relatively stable, single domain in the central sensor region. This initialization field can be provided by a barber pole, which is also used to cant the direction of the sense current relative to the easy axis magnetic vector.

For short strips, efforts have been made to maintain single domains by permanent longitudinal biasing from adjacent external permanent magnets or exchange coupled antiferromagnetic or permanent magnet material which forms a coupled film with the sensor.

Exchange or permanent magnet biasing is commonly employed. However, antiferromagnetic materials at an exposed interface can result in destructive corrosion and require a protection layer. Further, because exchange biasing is a quantum-mechanical interaction effect, reliable atomic interaction is required. Such processing is difficult, but with care can be achieved with good yields. The antiferromagnetic exchange effect is substantially reduced in typical disk drive operating environments due to a strong temperature dependence.

SUMMARY OF THE INVENTION

It is a primary object of the subject invention to provide an MR transducer having improved cross-talk suppression capability and enhanced longitudinal biasing. An advantage of the present invention is that the MR sensor has increased local anisotropy. A further advantage of the present invention is that for antiferromagnetic exchange coupling the MR sensor has a higher Neel Temperature. The present invention provides an additional layer of antiferromagnetic or permanent magnet material in contact with the magnetoresistive layer of the MR sensor.

In accordance with the present invention a thin film MR transducer includes a MR layer having an antiferromagnetic or permanent magnet layer in direct contact immediately above and below the magnetoresistive layer. The additional magnetic layer beneath the MR layer enhances the exchange coupling. Additionally, the second antiferromagnetic layer beneath the sensor serves to increase the Neel Temperature of the MR sensor.

The foregoing and other objects, features and advantages of the invention will be apparent from the following detailed description of the invention.

DESCRIPTION OF THE INVENTION

Figure 1:
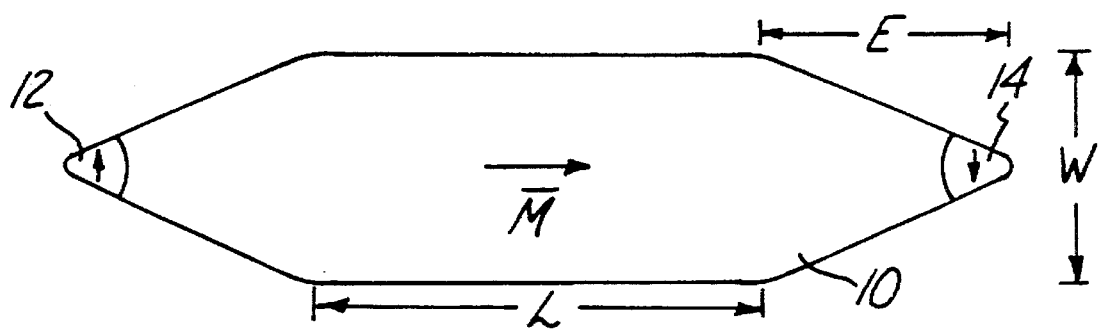
FIG. 1 is an elevation side view of a pseudo-ellipsoid MR sensor strip.

Referring to FIG. 1, a magnetoresistive (MR) sensor 10 having a pseudo ellipsoid structure magnetized along an easy axis M is shown. A central portion L has relatively flat sides compared to the curved sides of a true ellipse. The aspect ratio AR of overall length to height is typically 20:1, but can be less with no loss of effect. From the central region L, the sides converge to pieces in which small magnetic domains 12 and 14 spontaneously form. Preferably W=L and E, the length of an end, is on the order of L at a minimum, having no known maximum. The structure forms a very stable central region single domain indicated by the large right arrow in the center of the structure.

Experimentation with this structure shows that a thin layer of 200–500 angstroms NI: 82 Fe: 18 alloy, with an overall length of 100 microns, an L portion of 5 microns, and a width W of 5 microns requires 15 Oe to switch the magnetization vector of the central region to the hard axis, while only 1.0 Oe is required in an unpatterned bulk film.

Where high transverse fields can be expected, such as when an unshielded sensor is placed between or next to the poles of an inductive write head, longitudinal biasing is required to initialize or maintain a single domain state. There are various means for accomplishing this, for example, barber pole biasing, permanent magnetic or antiferromagnetic exchange biasing all provide a longitudinal field.

Figure 2:
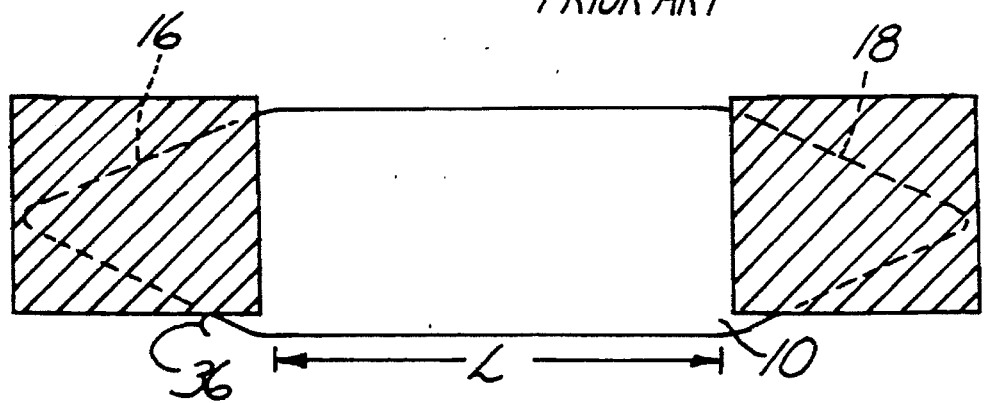
FIG. 2 is the strip of FIG. 1 having exchange-biasing material at the ends.

The domain stabilization process can be understood by recognizing that if the magnetization is somehow pinned at longitudinal boundaries of a thin film strip then the equilibrium magnetization direction can be controlled in the central region between the longitudinal boundaries, as shown in FIG. 2. Since there is no exchange coupled material in the central active region, there can be no signal loss due to current shunting. By proper patterning, the bimetallic interface can be eliminated at any exposed edge thus avoiding corrosion problems.

Figure 3:
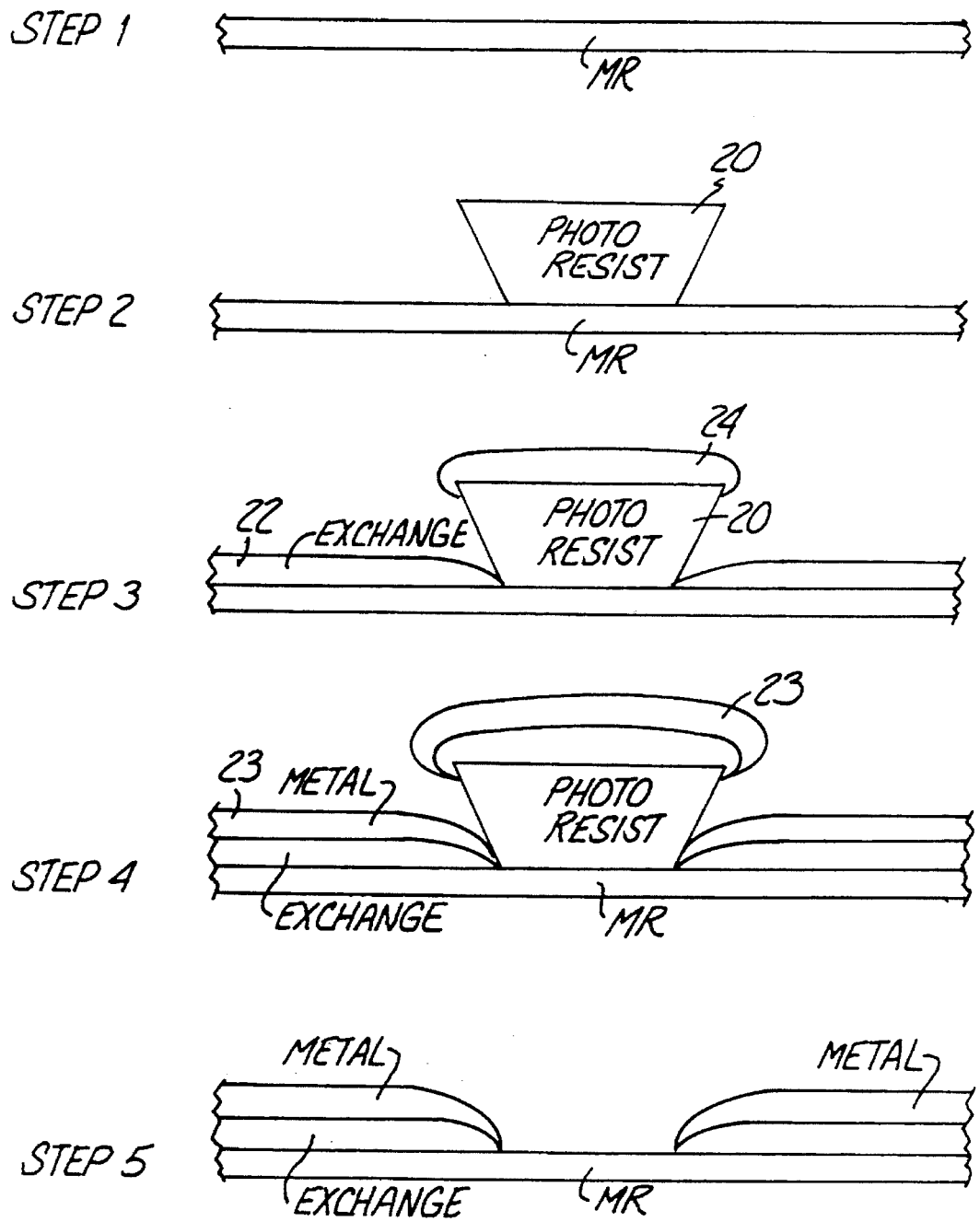
FIG. 3 illustrates the essential steps for depositing exchange-biasing material on the ends of a MR strip.

The essential steps for depositing exchange-biasing material on the ends of a MR strip to achieve the structure of FIG. 2 are illustrated in FIG. 3. In the first step, a strip of MR material is evaporated, sputtered or the like onto a substrate, not shown, in a uniform magnetic field directed along an easy axis and patterned. In the second step, a photo resist layer is laid down and patterned using conventional processes to form an island resist layer 20 with inwardly inclined sides. In the third step, the exchange material 22 is evaporated, sputtered or the like onto the combination. In step 4 contact metallization 23 is deposited. Step 5 employs a lift-off process wherein the resist, and exchange material 24 and metal 23 clinging to it are removed.

Figure 4:
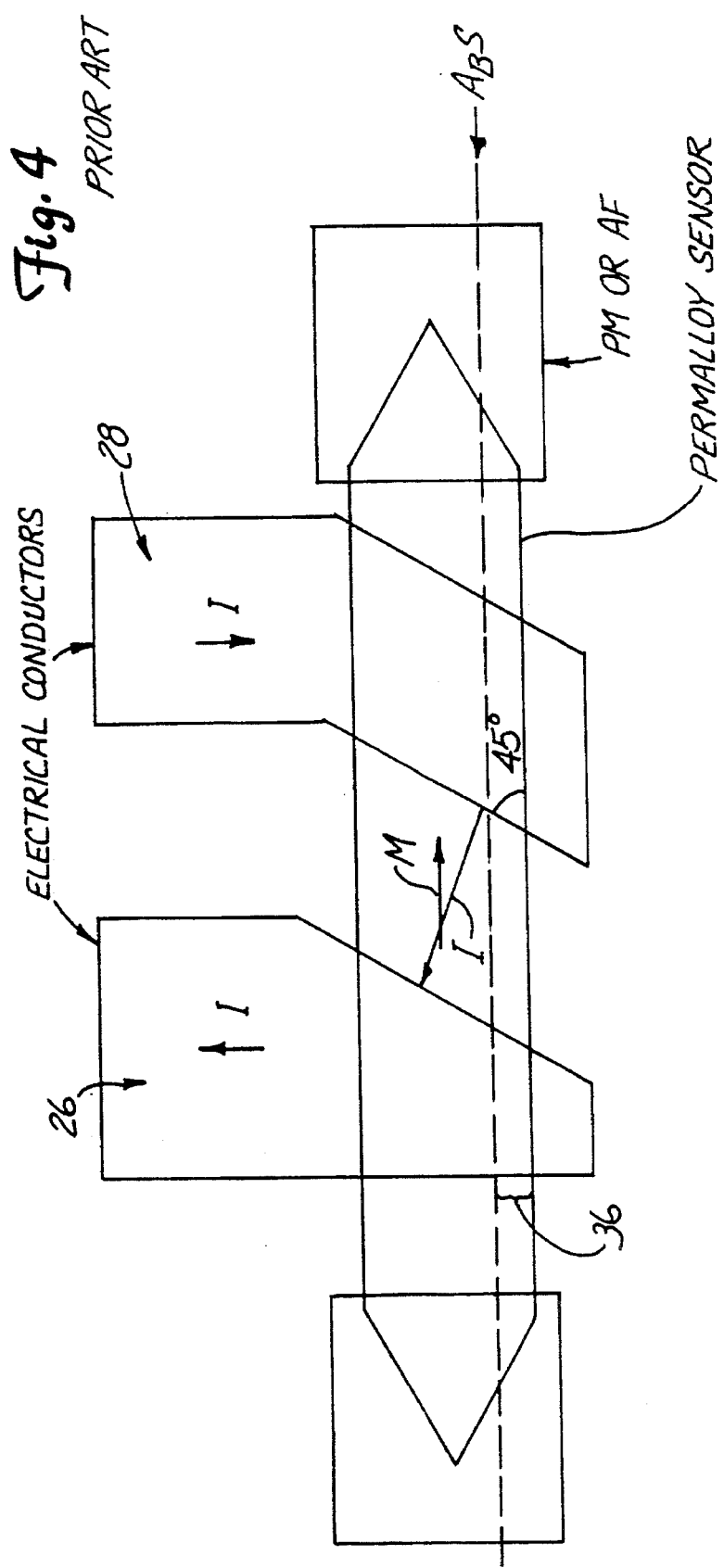
FIG. 4 is an elongated magnetoresistive strip having extended ends with exchange-biased material covering the inactive region and with electrical contacts providing biasing.

In FIG. 4, a pseudo-ellipsoid strip with exchange material on its ends extending to the flattened central region L is shown along with slanted electrical contacts to provide biasing. A recess 36 can be provided. For permanent magnetic material such as cobalt platinum this recess is unnecessary since this material will not corrode.

Figure 5:
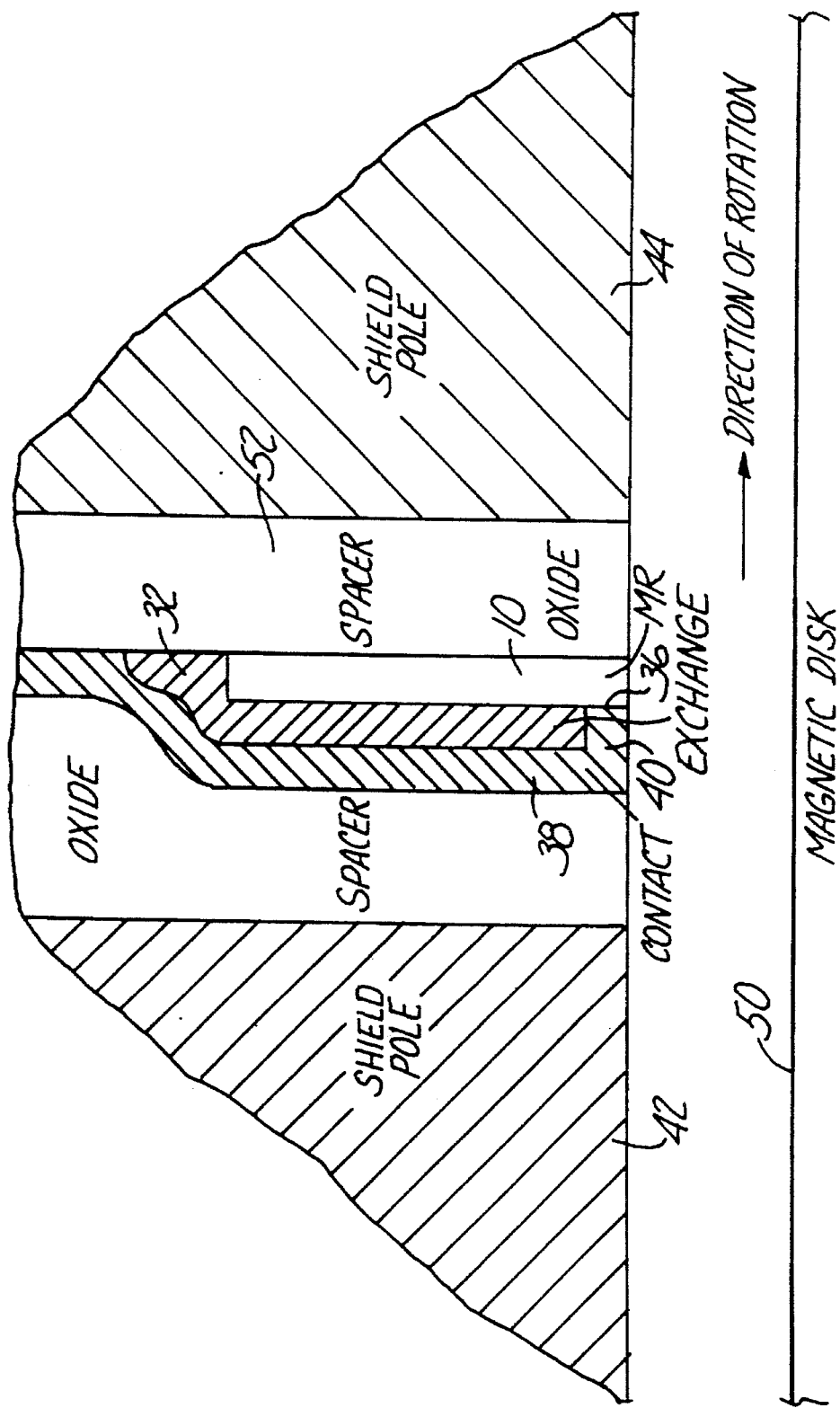
FIG. 5 is a cross section of a magnetoresistive head having a MR sensor with recessed exchange-biased material.

In FIG. 5, a cross-section of the exchange-biased strip 10 of FIGS. 2 or 4 mounted between shields 42, 44 of a typical head above a magnetic disk 50 is shown. The exchange material 32 is recessed a short distance 36 above the head surface, if necessary, and contact metal 38 includes leg 40 extending to strip 10 thereby shielding exchange material 32 from exposure if necessary. One of shields 42, 44 may comprise a pole of an inductive write head. The shields are separated by spacers 52 typically fabricated of non magnetic material such as $Al_2O_3$. By providing recess 36, leg 40 of contact 38 is in direct contact with MR material 10. This shields exchange material 32 from exposure, if necessary. Most heads contact disk surface 50 when disk rotation stops, possibly burnishing small amounts of head material away without affecting performance.

Figure 6:
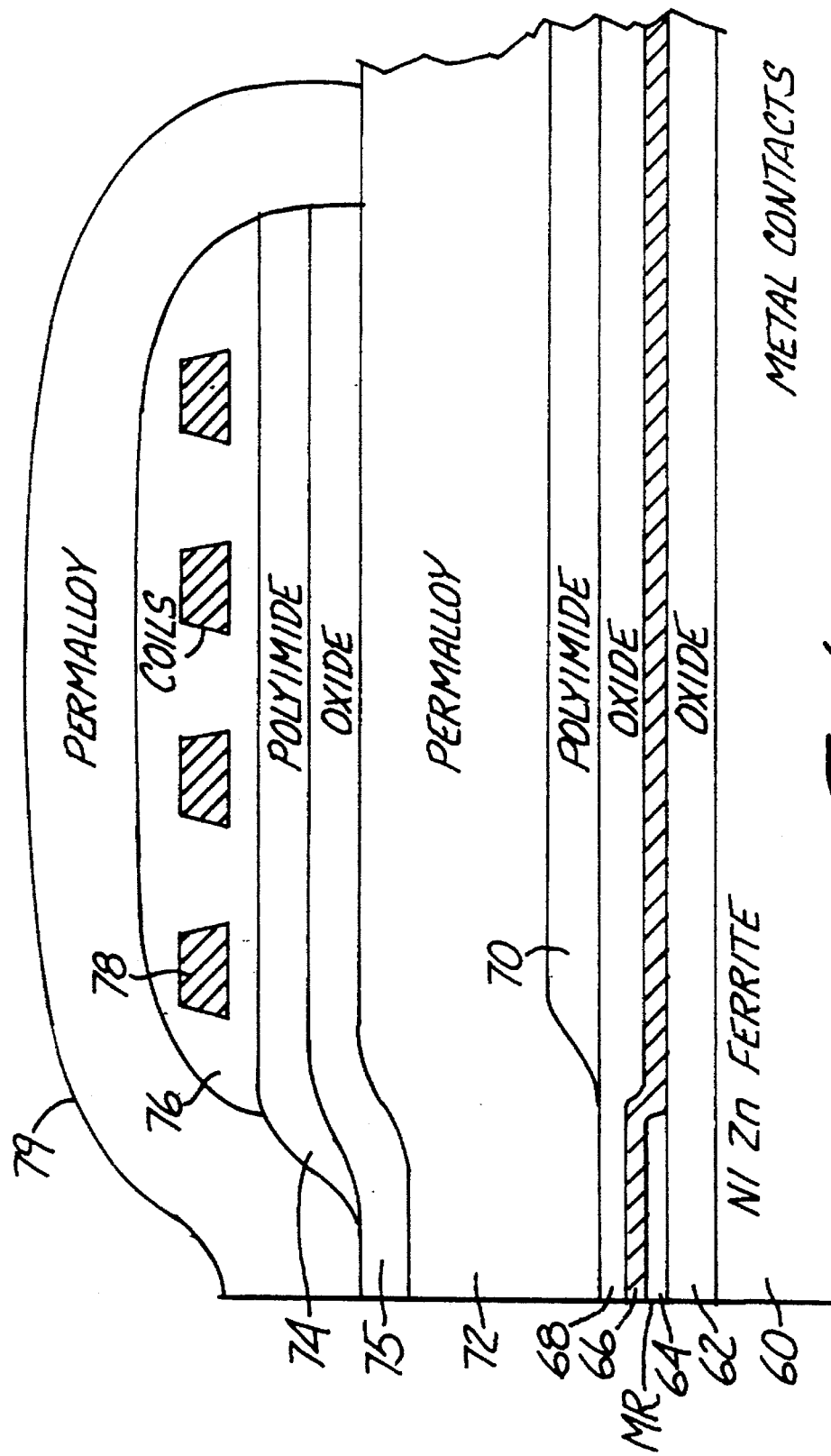
FIG. 6 shows the layer structure of a double-gap MR head.
Figure 7:
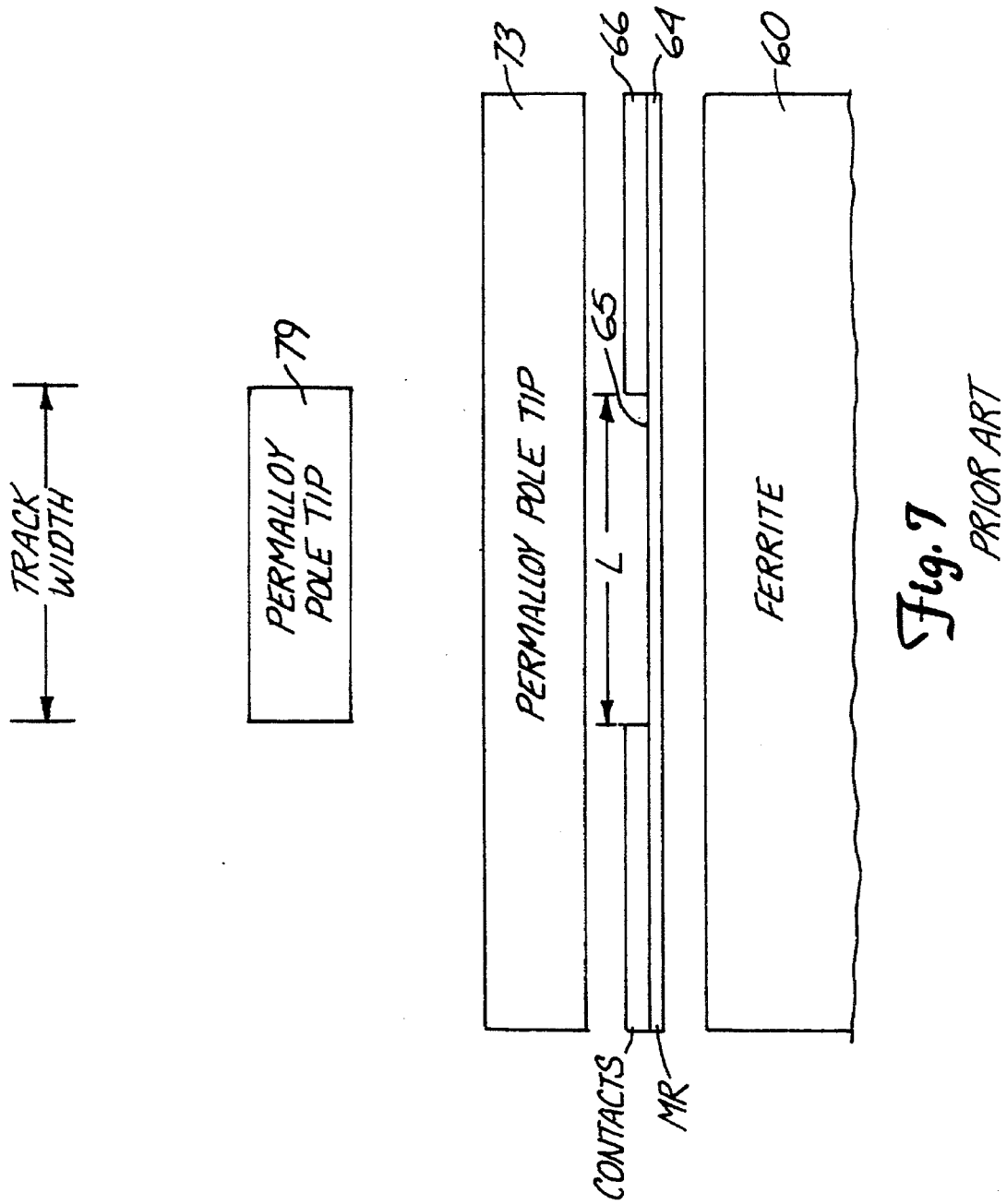
FIG. 7 is an elevation view of the essential elements of a double-gap MR head.

The existence of strong transverse magnetic fields causes relatively stable single domain regions to "fracture" into multiple domains, the source of Barkhausen noise. Strong magnetic fields are present between the pole tips of an inductive write head. To reduce the affect of the inductive write fields on the magnetoresistive head, it is normal to place the read head adjacent to the inductive write pole tips. This type of structure requires a soft magnetic shield, a shield/trailing pole tip and a leading pole tip. The structure of FIGS. 6 and 7 provides a magnetically quiet region for the MR sensor. The residual flux from the magnetic poles of the inductive write transducer is sufficiently low to permit reliable operation of very stable, shaped, single-domain sensors, such as the pseudo-ellipse 10 of FIG. 1, without longitudinal biasing.

FIG. 6 is a cross-section of the essential elements of a prior art design. A layer of oxide 62, preferably aluminum oxide, is deposited on a soft-magnetic substrate 60, preferably Sendust on $Al_2O_3$ or NiZn ferrite. Next, MR sensor material 64 is deposited in a magnetic field and patterned. Exchange biasing material may then be deposited and patterned if desired. Metal contacts 66 are then deposited on magnetoresistive strip 64. A second layer of oxide 68 is then deposited. These two oxide layers 62,68 comprise the read gap. A layer of polyimide or photoresist 70 is then deposited and patterned as shown to remove the layer adjacent the gap end of the head. Next a layer of ferromagnetic material 70 is laid down, preferably NiFe (Permalloy). This layer 70 comprises the trailing pole/shield. Next, a write gap oxide 75 of aluminum oxide or silicon dioxide is deposited followed by a second layer of polyimide or photoresist 74. Metal coils 78 are deposited and patterned. Two layers of polyimide or photoresist 76 are deposited and patterned to remove the portion not adjacent to coils 78. A final layer of ferromagnetic material 79 is deposited to encompass the coils and contact the other ferromagnetic layer 72 to form a continuous flux path. After the package is formed, it is typically sealed in a suitable non-magnetic material and the gap end lapped or otherwise processed to expose the gap(s) and provide a reliable gap height.

FIG. 7 is an end view of the essential elements of the double gap head of the preferred embodiment with spacing layers omitted for clarity. Shown in the Figure are Sendust on $Al_2O_3$ or ferrite substrate 60, MR strip 64, its lateral edge contacts 66 defining a central sensor region 65 of length L, and ferromagnetic trailing pole/shield 72, and leading pole 79. The length of leading pole 79 defines the written track width via magnetic mirroring with the trailing/shield as shown in the Figure. This length corresponds to length L (plus a processing guard band wherein length L is intentionally made smaller than the written track width to avoid possible cross talk) of central region 65 of MR strip 64. Typically, the strip is much longer than a track width to assist in providing a stable central region single domain. It is essential that trailing pole/shield 72 be as long as MR sensor 64 to shield it from side fringing fields originating during the writing process. This makes the head and trailing poles 79,72 of different lengths. But it has been discovered that this does not affect the written track width, which is generally defined by the length of leading pole 79 and the above-mentioned mirroring effects.

Figure 8:
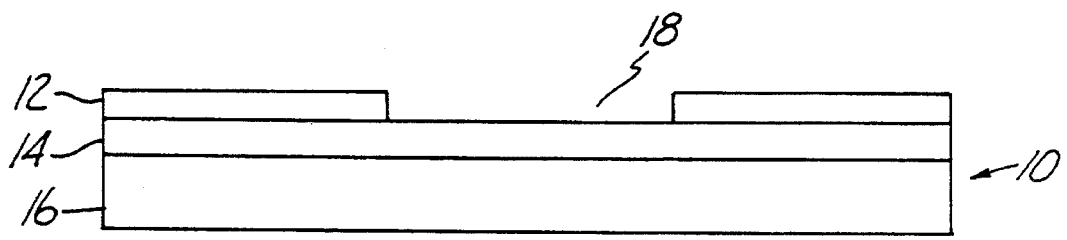
FIG. 8 is an elevation side view of an MR transducer assembly of the prior art.

FIG. 8 is a side view of a thin film magnetic head 10 having an exchange coupling layer. The exchange coupling layer of the prior art consists of permalloy 14 deposited upon substrate 16 of approximately 300 angstroms in thickness. Immediately on top of this permalloy or ferromagnetic layer is an exchange coupling layer 12 of permanent magnetic material. The exchange coupling material consists of a layer of approximately 100–300 angstroms in thickness and may be composed of cobalt platinum (PM) mixture. The combination of the exchange coupled layer and permalloy create an active area 18 determined by the absence of the exchange coupled layer material over a central portion of the permalloy layer. This active layer is typically less than 10 micrometers in length.

Figure 9:
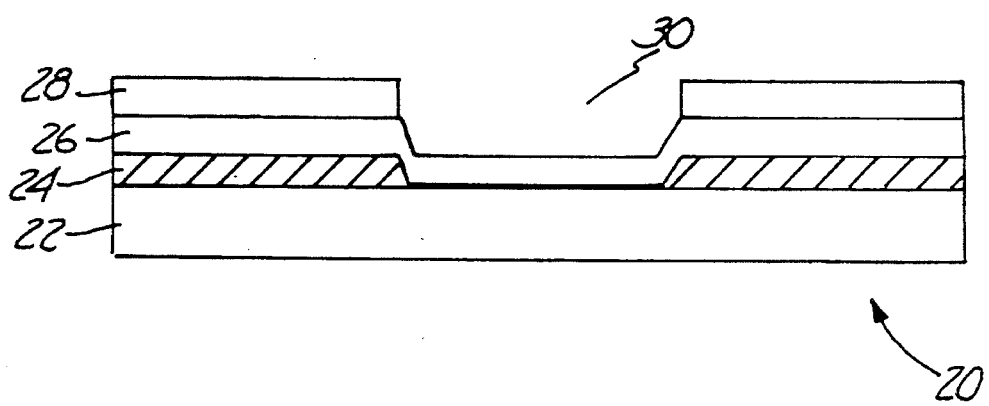
FIG. 9 is a side view of a MR sensor of the present invention having an exchange-biasing material at the ends.

FIG. 9 is a side view illustrating a thin film head 20 incorporating the present invention. An exchange coupling material 24 compressed of permanent magnetic material is first applied to substrate 22. Again, as with the prior art, the multiple layers contain a central portion 30 in which no exchange coupled material adheres to the substrate surface. This region defines the active area of the thin film head. The active region is also defined on either side by the longitudinal boundaries, as above-described with reference to FIG. 2. The first exchange coupled material layer may be in the range of 100 to 300 angstroms of thickness with a preferred thickness of approximately 200 angstroms. A second layer of material 26 is applied uniformly on top of the first exchange coupled material. The second layer is a permalloy or ferromagnetic layer and extends over the entire surface of the exchange coupled layer including the active area in which the exchange coupled layer material is absent. The permalloy layer may be in the range of 250 to 350 angstroms in thickness with a preferred thickness of approximately 275 angstroms. A second exchanged coupled layer 28 is then applied on top of the permalloy layer. This second exchange coupled layer has consistent area dimensions as the permalloy layer and as in the prior art defines an active head region 30 determined by the absence of any exchange coupled material covering a portion of the permalloy layer. The areas in which no exchange coupled material is applied either over or under the permalloy layer are approximately consistent with each other, thereby defining the active head region.

The addition of exchange coupled layer 24 beneath the permalloy layer increases the exchange coupling field strength by a factor of two by doubling the contact area between the exchange coupled material and the ferromagnetic surfaces.

The exchange coupling layers are fabricated from ferromagnetic permanent magnetic materials permanent magnetic layers of the present invention may be of cobalt platinum, cobalt chromium, cobalt chromium platinum, cobalt samarium or other material suitable as a permanent magnet layer in thin film head manufacturing. The permalloy layer is comprised of a mixture of nickle and iron. The materials for both the ferromagnetic and exchange coupled layers as well as the content percentage of the primary components of such layers are well known in the prior art.

What is claimed is:

1. A magnetoresistive read transducer assembly comprising a magnetoresistive conductive thin film layer and a first pair of opposing thin film permanent magnetic layers exchange coupled to a first portion of the magnetoresistive conductive thin film layer, the first portion of the magnetoresistive conductive thin film layer being sandwiched directly between the thin film layers of the first pair so that there is surface contact between each thin film layer of the first pair and the magnetoresistive conductive thin film layer, and a second pair of opposing thin film permanent magnetic layers exchange coupled to a second portion of the magnetoresistive conductive thin film layer, the second portion of the magnetoresistive conductive thin film layer being sandwiched directly between the thin film layers of the second pair so that there is surface contact between each thin film layer of the second pair and the magnetoresistive conductive thin film layer, the first and second pairs being spaced apart along the magnetoresistive conductive thin film layer to form an active region of the magnetoresistive layer between the first and second pairs and characterized by the absence of exchange coupled material in direct contact with the magnetoresistive conductive thin film layer in the active region.

2. The transducer assembly of claim 1 wherein at least one layer of said pair of thin film layers is fabricated of one of the group comprising cobalt platinum, cobalt chromum, cobalt samarium and cobalt platinum chromum.

3. A magnetoresistive read transducer assembly comprising:

first, second, third and fourth thin film layers fabricated of permanent magnetic material; and a magnetoresistive conductive thin film layer sandwiched directly between the first and second thin film layers and directly between the third and fourth thin film layers and having a first longitudinal boundary defined by the first and second thin film layers and a second longitudinal boundary defined by the third and fourth thin film layers, the thin film layers being exchange coupled to the magnetoresistive conductive thin film layer and the first and second layers being spaced apart from the third and fourth layers to define an active region of the magnetoresistive conductive thin film layer between the first and second longitudinal boundaries characterized by the absence of exchange coupled material in direct contact with the magnetoresistive conductive thin film layer in the active region.

4. The transducer assembly of claim 3 wherein at least one layer of said pair of thin film layers is fabricated of one of the group comprising cobalt platinum, cobalt chromum, cobalt samarium and cobalt platinum chromum.

5. The transducer assembly of claim 3 wherein the combined coercivity of said magnetoresistive conductive thin film layer is between approximately 100 to 1000 Oersted for permanent magnet coupling.

6. The magnetoresistive read transducer assembly of claim 3 wherein each one of said pair of thin film layers and said magnetoresistive layer are approximately 250 Angstroms thick.

* * * * *

UNITED STATES PATENT AND TRADEMARK OFFICE
CERTIFICATE OF CORRECTION

PATENT NO. : 5,475,550
DATED : December 12, 1995
INVENTOR(S) : PETER K. GEORGE

It is certified that error appears in the above-indentified patent and that said Letters Patent is hereby corrected as shown below:

Col. 5, line 21, delete "compressed", insert --comprised--

Signed and Sealed this

Thirtieth Day of July, 1996

Attest:

BRUCE LEHMAN

*Attesting Officer*  *Commissioner of Patents and Trademarks*